Nov. 11, 1924.　　　　　　　　　　　　　　　　　　　　1,514,663
S. D. HUMPHRIES
MACHINE FOR MAKING ASPHALT PAVEMENTS AND THE LIKE
Filed Aug. 12, 1922　　　7 Sheets-Sheet 5
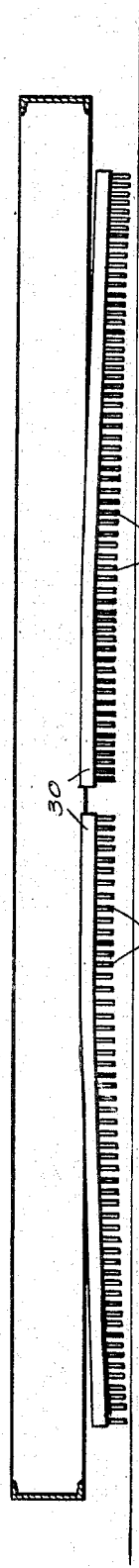
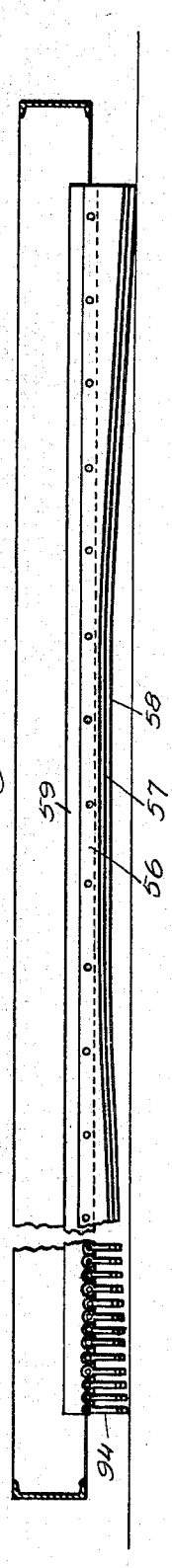
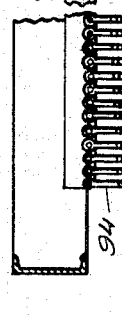
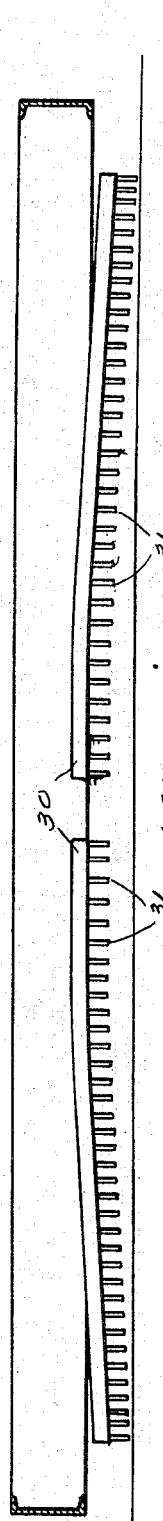
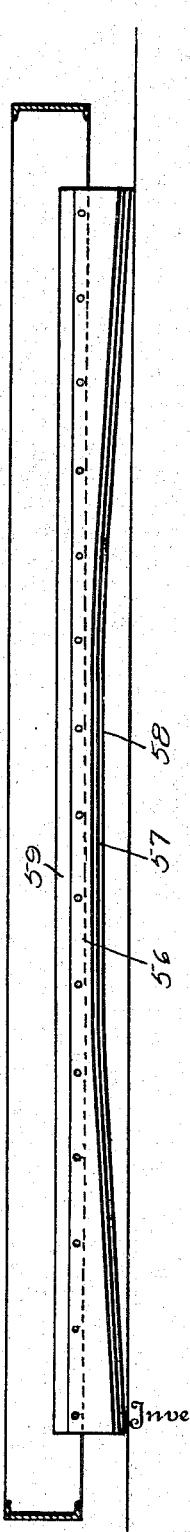
Inventor
S. D. Humphries
By Geo. F. Kimmel
Attorney

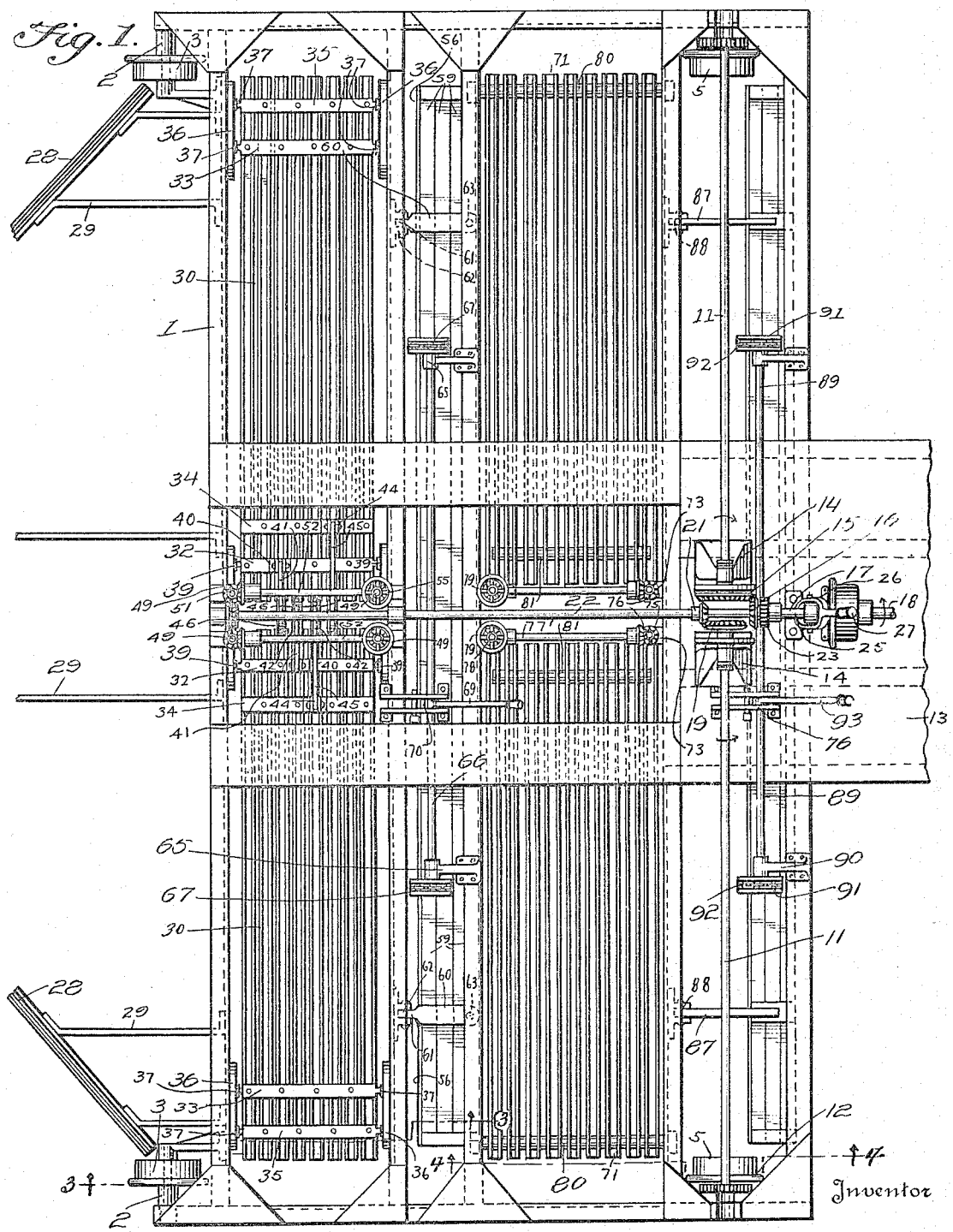

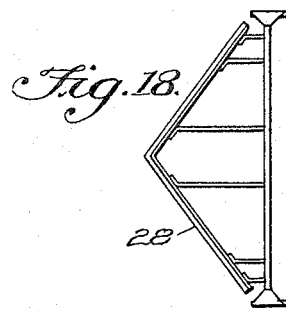
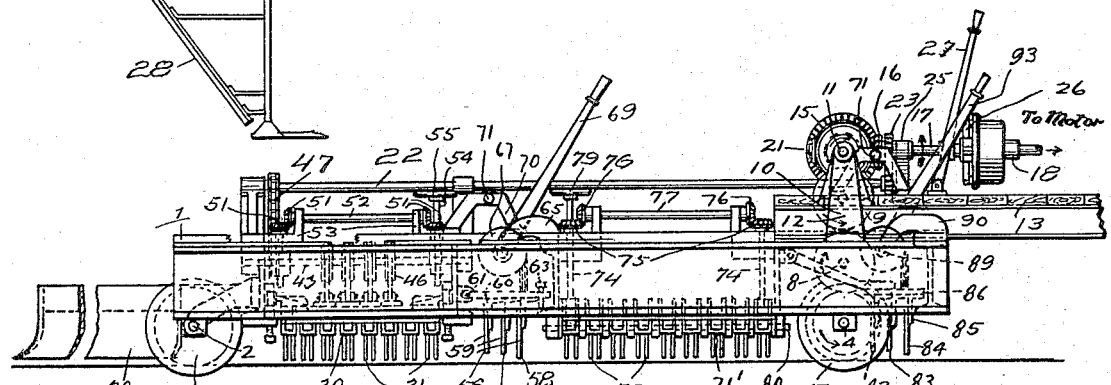
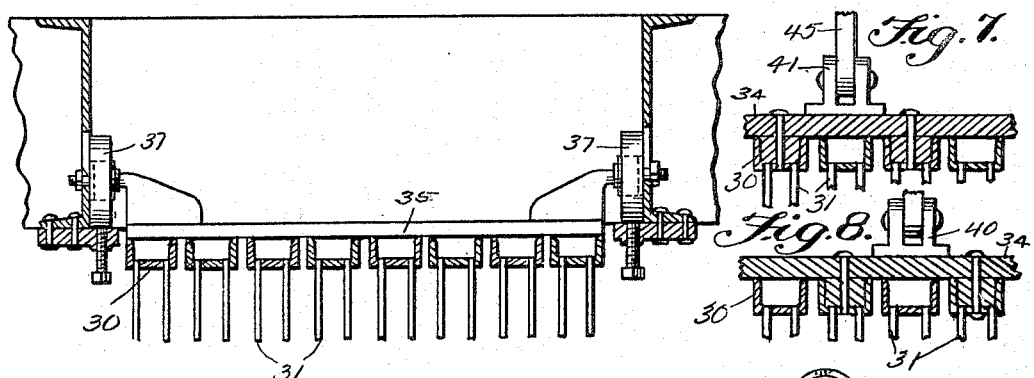
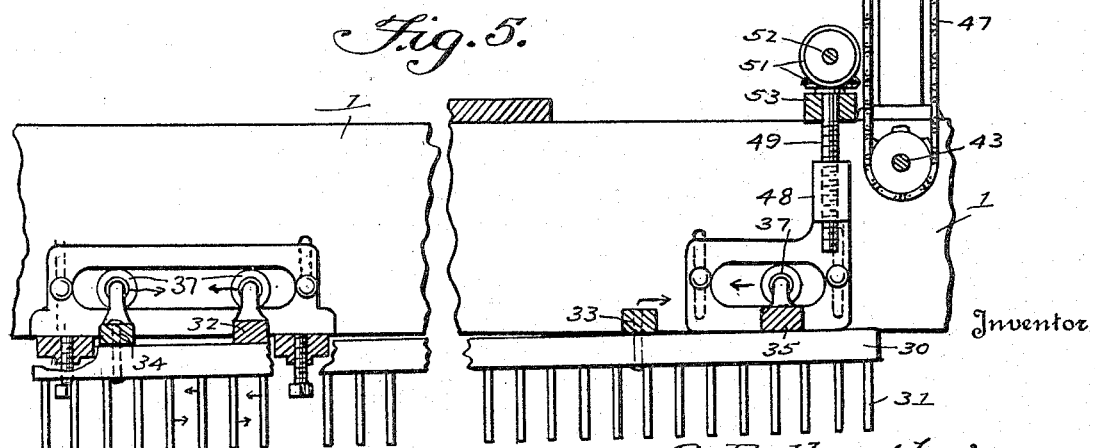

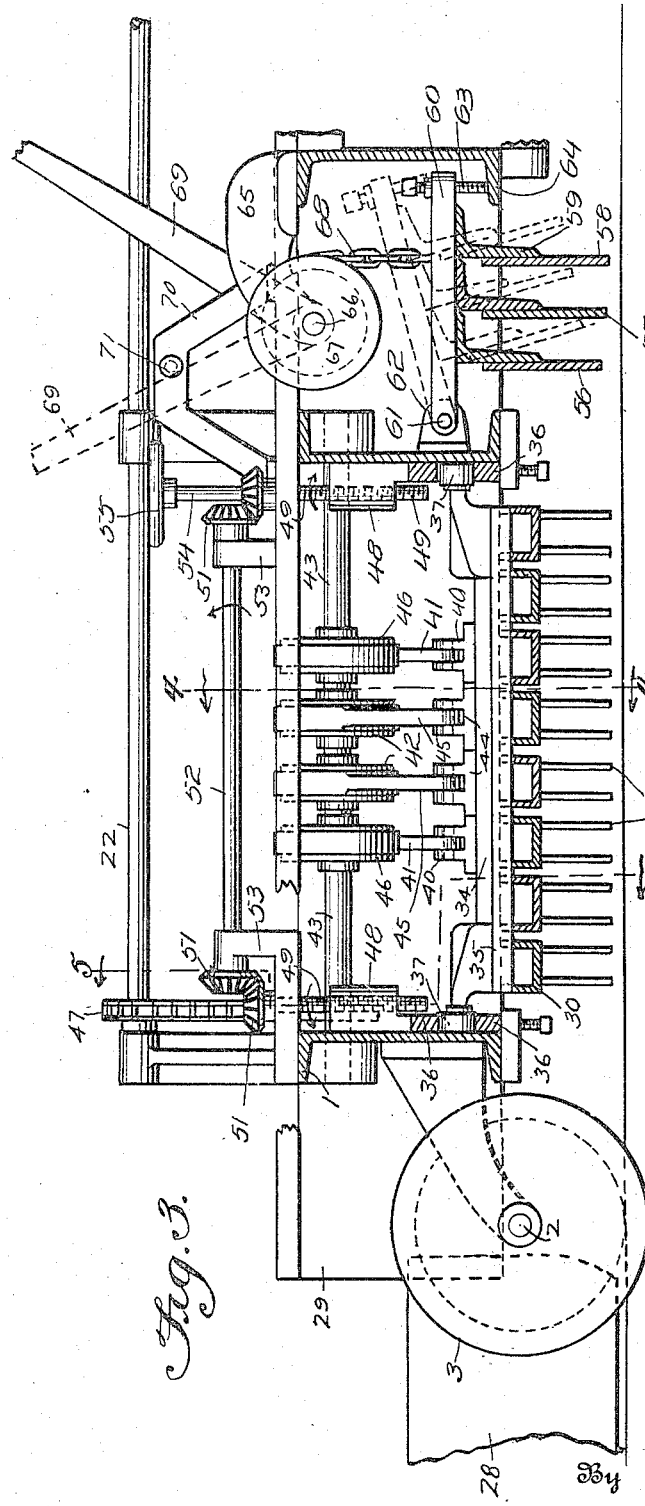

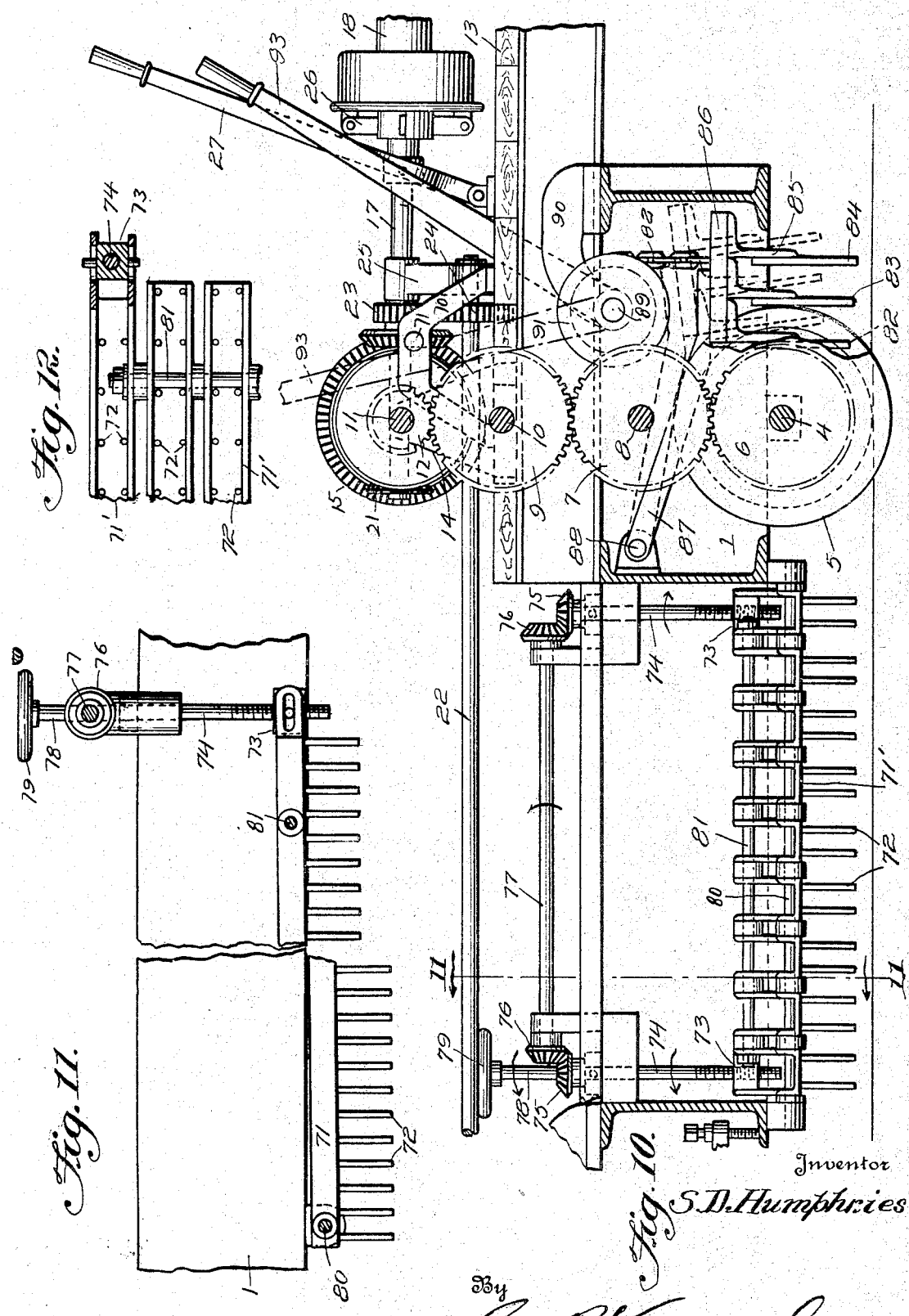

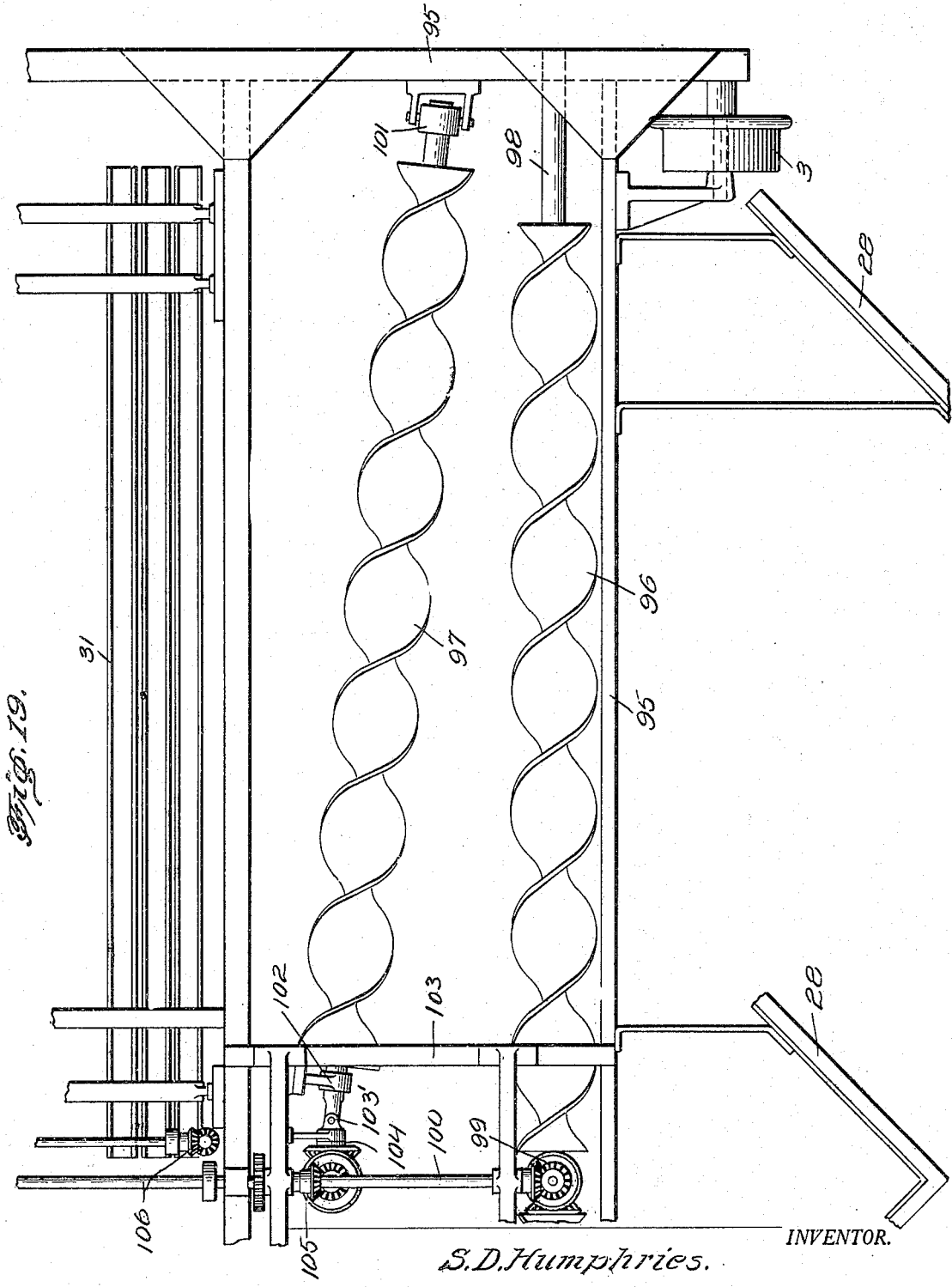

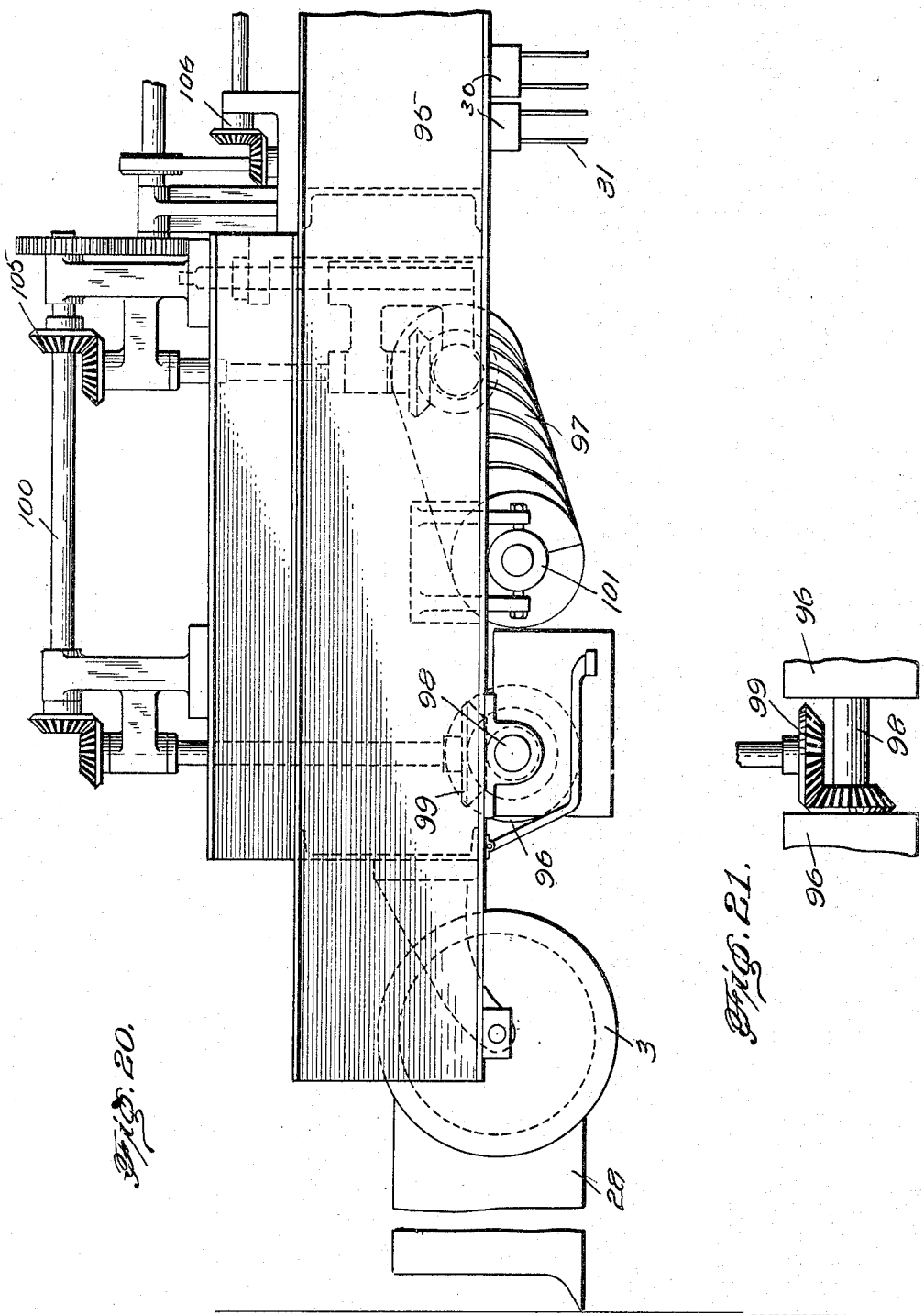

Patented Nov. 11, 1924.

1,514,663

UNITED STATES PATENT OFFICE.

STANLEY D. HUMPHRIES, OF FLINT, MICHIGAN.

MACHINE FOR MAKING ASPHALT PAVEMENTS AND THE LIKE.

Application filed August 12, 1922. Serial No. 581,426.

*To all whom it may concern:*

Be it known that I, STANLEY D. HUMPHRIES, a citizen of the United States, residing at city of Flint, in the county of Genesee and State of Michigan, have invented certain new and useful Improvements in Machines for Making Asphalt Pavements and the like, of which the following is a specification.

This invention relates to machines for making asphalt pavements and the like and has for its object to provide a machine of such class, in a manner as will be hereinafter set forth, first, with means for spreading the material forming the pavement body, to overcome the employment of shovels and to dispense with the walking on and tramping down of the surface by the laborers when using shovels for spreading the material; with means to thoroughly comb or rake the material after being spread, and, with means for leveling or grading to the degree desired.

Further objects of the invention are to provide a machine for the purpose set forth which is comparatively simple in its construction and arrangement, portable, strong, durable, efficient in its use and comparatively inexpensive to set up and operate.

With the foregoing and other objects in view, the invention consists of a novel construction, combination and arrangement of parts as hereinafter more specifically described and illustrated in the accompanying drawings, wherein is shown an embodiment of the invention, but it is to be understood that changes, variations and modifications can be resorted to, which fall within the scope of the claims hereunto appended.

In the drawings, wherein like reference characters denote corresponding parts throughout the several views:—

Figure 1 is a top plan view of a machine for making asphalt pavements in accordance with this invention, Figure 2 is a side elevation, Figure 3 is a sectional view taken on the line 3—3 of Figure 1, Figure 4 is a section on lines 4—4 of Figures 1 and 3, Figure 5 is a section on line 5—5, Figure 3, Figures 6, 7, 8 and 9 are sectional details illustrating the rakes, Figure 10 is an enlarged elevation illustrating the rear of the machine, Figure 11 is a section on line 11—11, Figure 10, Figure 12 is a top plan in detail of the rear rakes, Figure 13 is an elevation of one of the front rakes, Figures 14 and 15 are like views of the forward templets, Figure 16 is a similar view of the rear rakes, Figure 17 is a like view of the rear templet.

Figure 18 is a fragmentary view, in plan, showing the plow or spreader.

Figure 19, is a top plan, of one half of the forward end of the machine illustrating a modification, which is arranged forwardly of the raking elements, material feed or distributing elements in the form of spiral rollers.

Figure 20, is a side elevation of Figure 19.

Figure 21 is a detail of the operative drive connection for the forward spiral.

The machine is portable and is adapted to travel on the curbing of a road surface. The machine includes a body portion rectangular in contour, formed from suitable beams connected together in any suitable manner, and having the front thereof provided with inwardly extending axles 2, carrying flanged wheels 3, adapted to travel on the curbing of the pavements or road bed. The rear of the body 1 carries a pair of inwardly extending axles 4, each provided with a flanged wheel 5 and a gear wheel 6, the latter has meshing therewith a gear 7 carried by an axle 8, supported from the body 1. Meshing with the gear 7 is a gear 9, carried by the axle 10 mounted at the rear of the body 1.

At the rear of the body 1 a pair of shafts 11 are supported therein, and each of said shafts 11 on its outer end is provided with a pinion 12 which meshes with and drives the gear 10, whereby through a medium of the gears 6 and 7, the rear wheels 5 are operated so that the machine will be driven forwardly and rearwardly as occasion requires.

At the back of the body 1 a rearwardly extending platform 13 provided with supports 14 for the inner ends of shafts 11, and one of the shafts 11 carries a bevel gear 15 adapted to mesh with a bevel pinion 16, on a countershaft 17, operated from a drive shaft 18, the latter is driven from a prime mover, (not shown). The other shaft 11 has its inner end provided with a bevel gear 19, which meshes with bevel pinion, carried by a transmission shaft 22, operated from a pinion 23, carried by the countershaft 17, and which meshes with and drives a gear 24, on the inner end of the transmission shaft 22. Countershaft 17 and transmission shaft 22 are supported by the bracket 25 mounted on the platform 13. A clutching mechanism 26, operated by a lever 27, is employed for connecting the countershaft 17 and the drive shaft 18.

The body 1 is supported over the road bed or pavement by the flanged wheels 3 and 5 which travel on the curbing of the pavement and at the front of the body 1 a spreader 28 is secured, which is V-shape in contour and is employed for spreading the material to form the road bed or surface prior to the action of the rakes and templets. The spreader 28 is secured to the body 1, by forwardly projecting brace members 29. The machine is driven forward to cause the action of the spreader 28 on the material to spread the latter.

The machine embodies a series of what may be termed forward rakes, which are adapted to comb out and make flaky the material from which the road bed is made, preparatory to the action of the templets. The forward rakes are set up whereby they will be actuated in opposite directions relative to each other, and in a direction transverse with respect to the pavement or road bed. Two sets of forward rakes are employed and each forward rake of each set consists of a transversely extending carrier 30, provided with a series of tines 31.

Each set of forward rakes has associated therewith a pair of coupling bars 32, 33, and a pair of coupling bars 34, 35. The bars 32 and 33 associate and are secured to alternate carriers 30 of the forward rakes and the bars 34, 35 associate and are connected to the other carriers 30 of the forward rakes. Secured to the body 1 are slotted guide plates 36 into which extend and travel rollers 37 carried by the ends of the outer bars 33 and 35. Secured to the body 1 are slotted guide plates 38 into which extend and operate rollers 39 carried by the ends of the bar 32. Projecting upwardly of the bar 32 is a lug 40 to which is pivotally connected a link 41, which is attached to an eccentric 42 on the shaft 43. Projecting upwardly from the bar 34 is a lug 44 to which is pivotally connected a link 45 which is attached to an eccentric 46 carried by the shaft 43. An eccentric 42 is employed for use in connection with each bar 32 and an eccentric 46 is employed for use in connection with each bar 34. When the eccentrics are operated owing to the manner in which the carriers of the rake are connected therewith, alternate rakes of each set move in opposite directions, but the rakes of each set travel transversely of the road bed or the pavement and impart a thorough raking action to the material.

The shaft 43 is driven from the shaft 22 and to provide for this operation, the forward end of the shaft 22 is connected with a shaft 43 by a chain drive 47.

Each set of forward rakes are vertically adjusted and for this purpose vertically movable hangers 48 are provided and which are vertically adjustable, by the screw 49 engaging with the hangers 48, and which are provided with bevel pinions 51 carried on the ends of the shaft 52, the latter is supported by the bracket 53. One of the screws 49, is extended as at 54 and provided with a handle 55 whereby the screw can be rotated, causing a like operation to the other screw 49 as is obvious whereby the hangers 48 will be adjusted carrying the set of rakes therewith.

At the rear of the forward rakes, what is termed the forward templets are arranged, they are of a length equal to the width of the surface to be operated on. The forward templets are arranged in a set preferably three in number but the number can be increased or diminished if desired, as illustrated three forward templets are employed, as indicated at 56, 57 and 58. The templets 56, 57 and 58 are arranged whereby the forward templet is shorter than the intermediate templet 57, the latter is shorter than the rear templet 58. The templets 56, 57 and 58 are secured by angle arms 59 to a pair of pivoted supporting arms 60. The arms 60 are pivoted as at 61 to a bracket 62 secured to the body 1, each arm 60 carries an adjusting screw 63 for regulating the position of the templets 56, 57 and 58 with respect to the surface or road bed. The screws 63 associate with a flanged portion 64, of the body 1, which acts as a stop and support for the screw 63.

Mounted on the body 1 is a pair of brackets 65 which support a rock shaft 66, the latter has each end provided with a groove collar 67 carrying a chain 68, which is attached to an arm 60. Fixed to the shaft 66 is a lever arm 69 which is used to rock the shaft 66 to raise or lower the arm 60 so as to remove from or replace the templets to operative position. The lever 69 associates with brackets 70 carrying a stop 71 to arrest the movement of lever 69 when desired.

At the rear of the templets 56, 57 and 58, the rear rakes are provided and these rear rakes are arranged in sets and each rake of each rear set consists of a carrier 71 provided with a series of tines 72. Each set of rear rakes does not move laterally or transversely but is adjustable vertically, and these rear rakes only operate as machine travels forwardly and rearwardly. Each set of rear rakes has its inner ends provided with a pair of hangers 73, each of the hangers are engaged by an adjusting screw 74, provided with a bevel pinion 75, which meshes with a bevel gear 76 on the end of the shaft 77, one of the screws 74 is extended as at 78, and provided with a hand wheel 79, thereby to enable the operation of screw 74 causing the operation of the other screw 74 and the adjusting of the set of rakes. The outer end of each set of rear rakes has a coupling member 80, which is mounted in the body 1 and provides means whereby the outer end of the set can pivot when the inner end is adjusted. The inner end of each set of rear rakes is connected together by a coupling bar 81, but this bar 81 is not seated in the body 1.

The body portion 1, rearwardly of the rear rakes has arranged therein the rear templets which are indicated at 82, 83 and 84, these latter are connected by angle arms 85 to a plate 86 which is carried by an arm 87 pivoted as at 88 to the body 1. Two arms 87 are employed. At the rear of the body 1 a shaft 89 is arranged and which is supported by the brackets 90. Each end of the shaft 89 carries a grooved collar 91 to which is attached chain 92, the latter being attached to the templets 82, 83 and 84. A lever 93 is employed for rocking the shaft 89 so as to elevate or lower templets when desired.

The rakes as well as the templets conform in contour to the surface of the road bed and the rakes or templets, owing to the manner in which they are set up, can be adjusted relative to the road bed.

In Figure 15, the construction of each templet is illustrated as formed from a single piece of material having the lower portion curved to conform to the surface of the road bed, but it is obvious that instead of constructing the templet from a single piece of material it can be made from a series of tines, as illustrated at 94, Figure 14.

As the machine advances toward the pile of material, the material is spread by the spreader and following this spreading operation it is subjected to the forward rakes which are so set up that the rakes with parallel groups of tines are moved simultaneously in opposite directions. After the raking operation, the surface or material is operated on by the templets. Following this the rear rakes operate upon the material or surface when the machine is moved rearwardly or forwardly and after which the rear templets are thrown into operation.

In Figures 19 and 20, the machine is shown as provided forwardly of the raking elements, with material feeding or distributing elements in the form of spiral rollers. The lineal contour of such elements may be either straight or concave to give the approximate crown of the road. The spiral rollers are so formed that they feed or distribute the material from the center out towards either side. The rollers may be stationary as shown, or adjustable vertically.

In Figures 19 and 20, the forward part of the machine frame is indicated at 95 and the spiral rollers at 96, 97.

The roller 96 is of a length substantially to extend from near one side to the other side of the machine frame and is provided at each end with a spindle 98, only one shown, and which are journaled in the sides of the machine frame. The roller 96, intermediate its ends is operatively connected, as at 99 to a drive shaft 100 therefor.

A pair of rollers 97, are employed, only one of which is shown, and each of the rollers 97 extend rearwardly at an inclination. The roller 97, is supported at its outer end in a pivotal bearing 101. The bearing 101 is secured to the inner face of the side of the machine frame. The inner end of the roller 97, is supported, as at 102, from a frame bar 103', and is connected by a universal joint 103, to a driving element 104, therefor. The shaft 100 and driving element 104, are actuated from an operating means 105, which is operatively connected as at 106, with the driving means for the other elements of the machine.

Having thus fully described the invention, what is claimed, is:—

1. A machine for the purpose set forth comprising a portable body, two endwise opposed sets of raking elements carried thereby and each set extending transversely with respect to said body, means for actuating the elements of each set alternately in opposite directions with respect to each other, and means for independently adjusting each set of elements vertically.

2. A machine for the purpose set forth comprising a portable body, two endwise opposed sets of raking elements carried thereby and each set extending transversely with respect to said body, means for actuating the elements of each set alternately in opposite directions with respect to each other, means for independently adjusting each set of elements vertically, a set of templets arranged rearwardly of and common to said sets of raking elements, the templets of said sets successively increasing in size forwardly, and means for regulating the position of said set of templets.

3. A machine for the purpose set forth comprising a portable body, two endwise opposed sets of raking elements carried thereby and each set extending transversely with respect to said body, means for actuating the elements of each set alternately in opposite directions with respect to each other, means for independently adjusting each set of elements vertically, and a spreader element positioned forwardly of said sets of raking elements.

4. A machine for the purpose set forth comprising a portable body, two endwise opposed sets of raking elements carried thereby and each set extending transversely with respect to said body, means for actuating the elements of each set alternately in opposite directions with respect to each other, means for independently adjusting each set of elements vertically, said opposed sets of raking elements conforming in contour to the surface of a road bed, and a spreader arranged forwardly of said sets of raking elements.

5. A machine for the purpose set forth comprising a body portion, a set of templets disposed transversely with respect to said body portion, said templets increasing in height relative to each other and having their working edges conforming in contour to the work to be operated on, and means for adjustably connecting said set to the body portion.

6. In a machine for the purpose set forth, a portable body portion, a spreader arranged at the front thereof, two sets of raking elements arranged at the rear of the spreader, means for alternately moving the two sets in opposite directions relatively to each other and for alternately moving the elements of each set transversely with respect to the work operated on, and a set of templets carried by the body portion and arranged at the rear of raking elements.

7. In a machine for the purpose set forth, a portable body portion, a spreader arranged at the front thereof, two sets of raking elements arranged at the rear of the spreader, means for alternately moving the two sets in opposite directions relatively to each other and for alternately moving the elements of each set transversely with respect to the work operated on, and a set of templets carried by the body portion and arranged at the rear of raking elements, two sets of raking elements carried by the body portion and arranged at the rear of said set of templets, and a set of templets arranged at the rear of the last mentioned raking element.

8. In a machine for the purpose set forth, a portable body portion, a set of templets, said templets of different heights relative to each other, arms pivoted to the body portion and supporting said templets, means for limiting the downward movement of said arms to adjust the position of the templets, means for elevating and lowering the templets, two sets of endwise opposed raking elements arranged forwardly of said templets and extending transversely with respect to said body portion, means for operating the raking elements of each set alternately in opposite directions with respect to each other, means for independently adjusting each set of raking elements vertically, and a vertically adjustable and transversely extending set of raking elements arranged rearwardly of said set of templets.

9. In a machine for the purpose set forth comprising a body portion, a plow projecting forwardly therefrom, two sets of raking elements arranged at the rear of the plow, means for alternately moving the two sets in opposite directions relatively to each other and for alternately moving the elements of each set alternately in opposite directions, templets arranged at the rear of the raking elements and means for adjusting the templets.

In testimony whereof, I affix my signature hereto.

STANLEY D. HUMPHRIES.